United States Patent
Kelm et al.

(10) Patent No.: US 9,430,827 B2
(45) Date of Patent: Aug. 30, 2016

(54) SEGMENTATION OF A CALCIFIED BLOOD VESSEL

(71) Applicant: SIEMENS AKTENGESELLSCHAFT, Munich (DE)

(72) Inventors: Michael Kelm, Erlangen (DE); Felix Lugauer, Erlangen (DE); Jingdan Zhang, Bellevue, WA (US); Yefeng Zheng, Dayton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 22 days.

(21) Appl. No.: 14/148,758

(22) Filed: Jan. 7, 2014

(65) Prior Publication Data

US 2014/0355850 A1    Dec. 4, 2014

Related U.S. Application Data

(60) Provisional application No. 61/829,661, filed on May 31, 2013.

(51) Int. Cl.
    *G06K 9/00*       (2006.01)
    *G06T 7/00*       (2006.01)

(52) U.S. Cl.
    CPC ............ *G06T 7/0012* (2013.01); *G06T 7/0083* (2013.01); *G06T 7/0087* (2013.01); *G06T 7/0089* (2013.01); *G06T 7/0093* (2013.01); *G06T 2207/10081* (2013.01); *G06T 2207/20076* (2013.01); *G06T 2207/30048* (2013.01); *G06T 2207/30101* (2013.01); *G06T 2207/30172* (2013.01)

(58) Field of Classification Search
None
See application file for complete search history.

(56) References Cited

U.S. PATENT DOCUMENTS

| | | | |
|---|---|---|---|
| 5,881,124 A | 3/1999 | Giger et al. | |
| 6,201,543 B1 | 3/2001 | O'Donnell et al. | |
| 7,379,572 B2 | 5/2008 | Yoshida et al. | |
| 2004/0147838 A1* | 7/2004 | Londt | A61B 6/583 600/425 |
| 2004/0165756 A1* | 8/2004 | Mielekamp | G06T 7/0012 382/130 |
| 2005/0063578 A1 | 3/2005 | Zhang et al. | |
| 2005/0254697 A1 | 11/2005 | Zhang et al. | |
| 2006/0023927 A1 | 2/2006 | Zhang et al. | |
| 2006/0120585 A1 | 6/2006 | Zhang et al. | |

(Continued)

OTHER PUBLICATIONS

Wesarg S. et al: Localizing Calcifications in Cardiac CT Data Sets Using a New Vessel Segmentation Approach; Journal of Digital Imaging, vol. 19; No. 3; pp. 249-257; XP019388047; ISSN: 1618-727X; DOI 0.1007/S10278-006-9947-6; Jun. 7, 2006.

(Continued)

*Primary Examiner* — Hadi Akhavannik
(74) *Attorney, Agent, or Firm* — Harness, Dickey & Pierce, P.L.C.

(57) ABSTRACT

A method is disclosed for segmentation of a calcified blood vessel in image data. An embodiment of the method includes providing a vesseltree representation of the blood vessel; providing a number of preliminary boundary representations of a number of cross-sections of the blood vessel; providing a number of intensity profiles in the image data in the number of cross-sections; determining a calcification in the cross-section based on the intensity profile; and correcting each preliminary boundary representation into a corrected boundary representation which excludes the calcification from an inner part of the blood vessel. A segmentation system is also disclosed.

20 Claims, 9 Drawing Sheets

(56) References Cited

U.S. PATENT DOCUMENTS

| | | | |
|---|---|---|---|
| 2007/0058865 | A1 | 3/2007 | Li et al. |
| 2007/0086637 | A1 | 4/2007 | Zhang |
| 2007/0248250 | A1* | 10/2007 | Gulsun et al. .............. 382/128 |
| 2008/0002870 | A1 | 1/2008 | Farag et al. |
| 2008/0101667 | A1* | 5/2008 | Begelman .......... A61B 5/02007 382/128 |
| 2008/0317308 | A1 | 12/2008 | Wu et al. |
| 2009/0136103 | A1 | 5/2009 | Sonka et al. |
| 2009/0226057 | A1 | 9/2009 | Mashiach et al. |
| 2010/0092053 | A1* | 4/2010 | Manabe et al. .............. 382/128 |
| 2014/0003696 | A1 | 1/2014 | Taghva |
| 2014/0355850 | A1 | 12/2014 | Kelm et al. |
| 2014/0355854 | A1 | 12/2014 | Kelm et al. |
| 2015/0235360 | A1 | 8/2015 | Zheng et al. |

OTHER PUBLICATIONS

Wesarg S. et al: Segmentation of vessels: the corkscrew algorithm; Proceedings of Spie; vol. 5370; pp. 1609-1620; XP055183179; ISSN: 0277-786X; DOI: 10.1117/12.535125; May 12, 2004.

Lesage D.et al: A review of 3D vessel lumen segmentation techniques: Models features and extraction schemes; Medical Image Analysis; Oxford University Press; GB; vol. 13; No. 6; pp. 819-845; XP026718617; ISSN: 1361-8415, DOI:10.1016/J.Media.2009.07.011; Dec. 1, 2009.

Mohr et al: Accurate Lumen Segmentation and Stenosis Detection and Quantification in Coronary CTA; Proceedings of 3D Cardiovascular Imaging: a MICCAI segmentation challenge workshop; XP055183196, Retrieved from the Internet: URL:http://coronary.bigr.nl/stenoses/pdf/Mohr_TMVSE_221.pdf; Oct. 1, 2012.

Kelm B.et al: Detection, Grading and Classification of Coronary Stenoses in Computed Tomography Angiography; in Medical Image Computing and Computer-Assisted Intervention—MICCAI 2011; Springer Verlag; XP055183216; ISBN: 978-3-64-223625-9; vol. 6893, pp. 25-32; DOI:10.1007/978-3-642-23626-6 4; Jan. 1, 2011.

Li K. et al: Optimal Surface Segmentation in Volumetric Images—A Graph—Theoretic Approach; IEEE Transactions on Pattern Analysis and Machine Intelligence; vol. 28; No. 1; pp. 119-134; XP001523355; ISSN: 0162-8828; Jan. 1, 2006.

Lugauer F. et al: Improving Accuracy in Coronary Lumen Segmentation via Explicit Calcium Exclusion; Learning-based Ray Detection and Surface Optimization; Progress in Biomedical Optics and Imaging Spie—International Society for Optical Engineering Bellingham US; vol. 9034; pp. 90343U-90343U; XP060031806; ISSN: 1605-7422, DOI: 10.1117/12.2043238; ISBN: 978-0-8194-9850-2; Mar. 21, 2014.

Extended European Search Report dated May 15, 2013.

Zheng et al.: Model-Given Centerline Extraction for Severely Occluded Major Coronary Arteries. In: Machine Learning in Medical Imaging. 2012. pp. 10 to 18.

Ishikawa, H., "Exact optimization for Markov random fields with convex priors," IEEE Transactions on Pattern Analysis and Machine Intelligence, vol. 25, No. 10, pp. 1333-1336, Oct. 2003.

U.S. Office Action for corresponding U.S. Appl. No. 14/148,759 mailed Sep. 9, 2015.

Zhu et al—Graph-Based Optimization with Tubularity Markov Tree for 3D Vessel Segmentation, Computer Vision and Pattern Recognition (CVPR), 2013 IEEE Conference, Jun. 23-28, 2013.

Cemil Kirbas et al—A review of Vessel extraction techniques and algorithms, 2003, Vision Interfaces and Systems Laboratory (VISLab).

Notice of Allowance for corresponding U.S. Appl. No. 14/148,759 mailed Mar. 30, 2016.

* cited by examiner

FIG 9
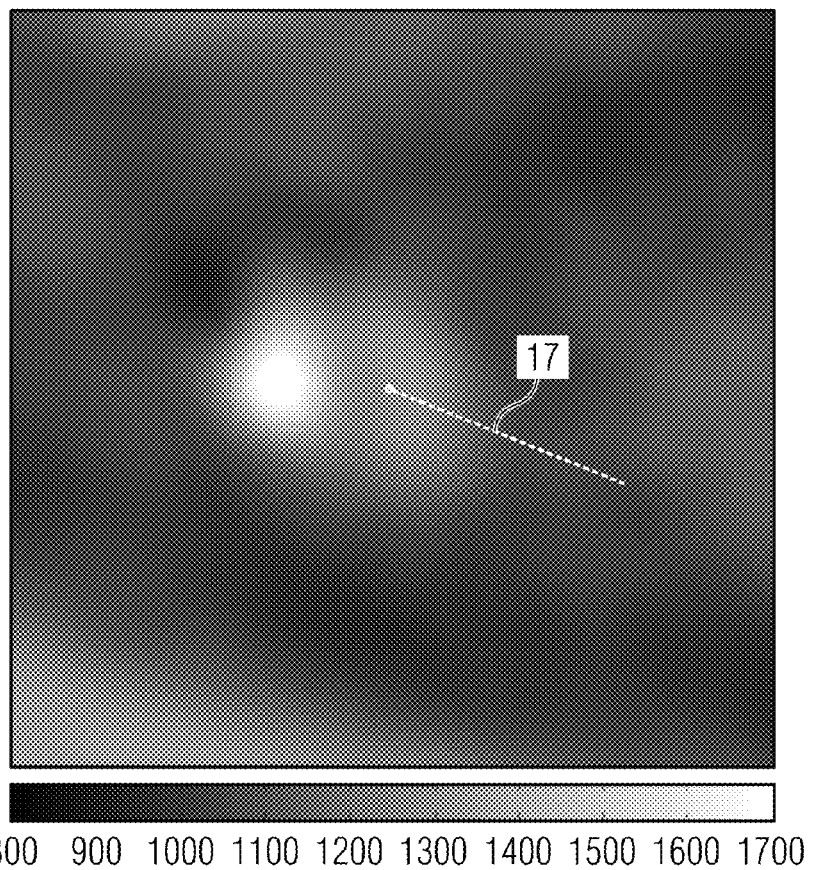
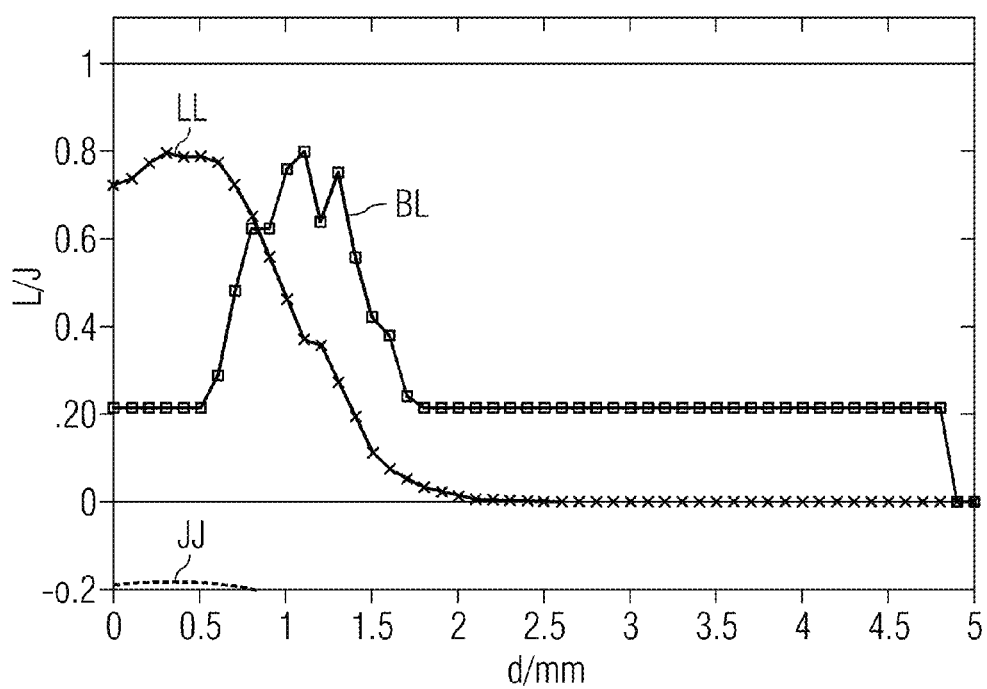

FIG 10
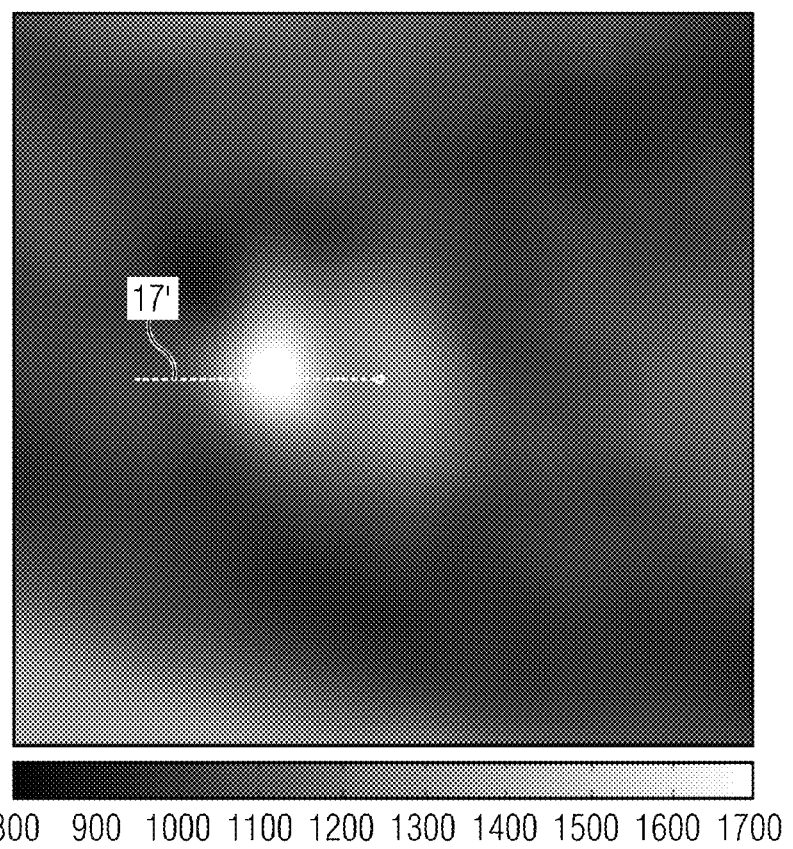
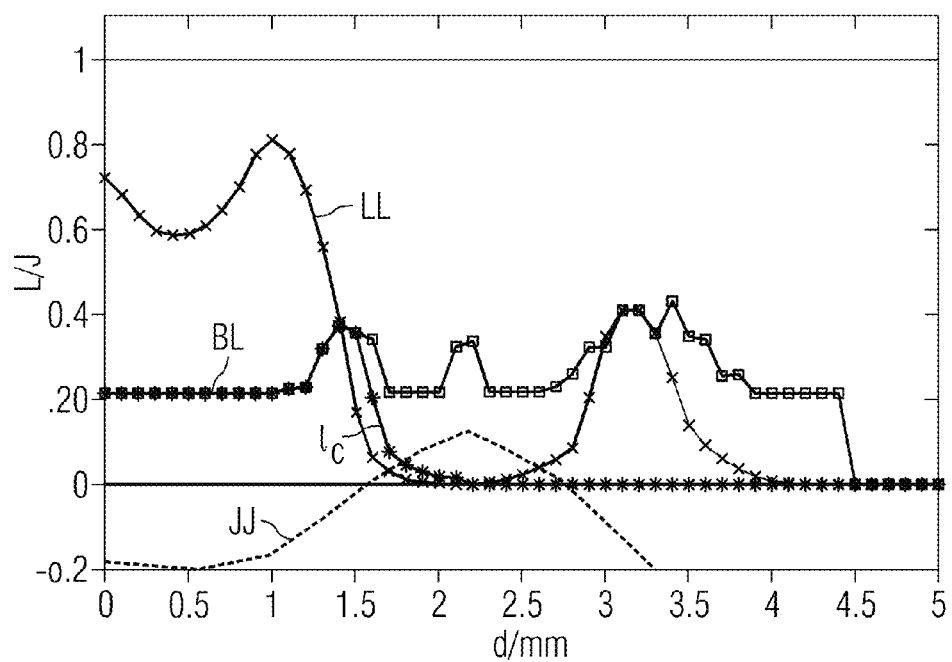

SEGMENTATION OF A CALCIFIED BLOOD VESSEL

PRIORITY STATEMENT

The present application hereby claims priority under 35 U.S.C. §119 to U.S. patent application No. 61/829,661 filed May 31, 2013, the entire contents of which are hereby incorporated herein by reference.

FIELD

At least one embodiment of the present invention generally relates to a method for segmentation of a calcified blood vessel in image data. At least one embodiment of the present invention also generally relates to a segmentation system for that purpose.

BACKGROUND

According to the American Heart Association, coronary artery disease (CAD) is a leading cause of death in the western world. The current diagnostic standard for CAD is conventional invasive angiography (ICA), which involves a considerable amount of risk and cost. New generations of cardiac computed tomography (CT) scanners enable the acquisition of Coronary CT Angiography (CCTA) images with unprecedented quality. Coronary stenoses can be detected with high sensitivity in CCTA which allows that method to be used as a gatekeeper to invasive diagnostic and surgical procedures such as ICA.

Methods for the automatic detection of coronary stenoses in CCTA have been proposed for clinical trials. Recently, CCTA has also been proposed for the simulation of pressure distributions along coronary stenoses and for the computation of the so-called fractional flow reserve (FFR) which is indicative for ischemia-causing lesions. Both an automatic detection of coronary stenoses as well as the simulation of their hemodynamic relevance (i.e. the simulation-based detection of pressure drops within the coronary vessels) rely on accurate segmentation of the coronary lumen in the image data provided. This is a challenging task as coronary vessels are comparatively small (extending to only a few voxels in image data in their distal parts) whereas CCTA image volumes are of varying quality (in particular with relation to noise, artifacts, contrast homogeneity etc.). Accurate segmentation is further complicated as the contrast of the vessel lumen is only slightly higher than that of non-calcified plaques but lower than that of calcified plaques. Therefore, non-calcified plaques appear optically very similar to the background of the vessel, in particular in a contrast-enhanced image acquisition process. On the other hand, calcified plaques appear to be part of the lumen of the vessel in such contrast-enhanced image acquisition processes as they show about the same appearance as the contrast agent in the image data. Therefore, a distinction between calcified plaque and lumen of the blood vessel through which blood can flow is very difficult to make.

SUMMARY

At least one embodiment of the present invention is to provide for an improved possibility of segmentation of calcified blood vessels from image data.

A method and a segmentation system are disclosed.

According to at least one embodiment, a method comprises providing a vesseltree representation of the blood vessel. Such vesseltree representation may for instance comprise a number of progression lines of the blood vessel(tree) such as a centerline or the like.

providing a number of preliminary boundary representations of a number of cross-sections of the blood vessel. Such a preliminary boundary representation may for instance comprise a boundary map of the cross-section.

providing a number of intensity profiles in the image data in the number of cross-sections. The intensity profiles represent intensities of the image data in the cross-sections and thus depend on the acquisition method used for image data acquisition. For instance, in CT, intensity profiles are based on (i.e. correspond to) Hounsfield Unit values in the image data.

determining a calcification in the cross-section based on the intensity profile. The intensity profile is now used to detect calcifications, e.g. calcified plaque.

correcting each preliminary boundary representation into a corrected boundary representation which excludes the calcification from an inner part of the blood vessel.

According to at least one embodiment of the invention, a segmentation system comprises:

an input interface for the image data. Via that interface the image data are fed into the segmentation system, for instance from a PACS or from an imaging device.

a first provision unit realised to provide a vesseltree representation of the blood vessel. Such provision unit can be realised as a computation unit which derives the vesseltree representation from the image data, but also merely comprise an input interface—which can also be combined with the first input interface, for instance as one common interface.

a second provision unit (also input interface) realised to provide a number of preliminary boundary representations of a number of cross-sections of the blood vessel. This second provision unit can be combined with the first provision unit or stand alone. Again, it may be realized as a computation unit which derives the preliminary boundary representations from the image data or it may comprise an input interface, which can, again be freely combined with any of the above-mentioned other input interfaces in the according manner.

a third provision unit realised to provide a number of intensity profiles in the image data in the number of cross-sections. That third provision unit is preferably realized as a computation unit which, based on the image data, provides the intensity profiles.

a determination unit which in operation determines a calcification in the cross-section based on the intensity profile. That determination unit is again preferably realized as a computation unit which, based on the intensity profiles, determines the calcification.

a correction unit which in operation corrects each preliminary boundary representation into a corrected boundary representation which excludes the calcification from an inner part of the blood vessel.

The segmentation system according to at least one embodiment of the invention, in particular its first and/or second and/or third provision units, the determination unit, and the correction unit (but also other components of the segmentation system which are mentioned below) may be partially or wholly accomplished by hardware components, for example using semiconductor chips such as ASICs (Application Specific Integrated Circuits), FPGAs (Field Programmable Gate Arrays), or PLAs (Programmable Logic Arrays). They may, however, also be comprised of software components or combinations of hardware and software components. Therefore, the invention also concerns a computer programme product computer programme product directly loadable into a processor of a programmable segmentation system comprising programme code segments to conduct all steps of a method according to embodiments of the invention when the computer programme product is executed on the segmentation system.

Generally, the method according to at least one embodiment of the invention can be part of any larger methodological frameworks of segmentational steps. It is however preferred that it is included in a particularly preferred larger segmentation method which comprises:

a) providing an image representation of the calcified blood vessel, b) providing a start surface model, comprising a mesh with a plurality of vertices connected by edges, in particular undirected edges, c) defining for each vertex of the plurality of vertices a ray normal to the surface model at the position of the (corresponding) vertex, d) assigning more than two (for instance five) labels to each vertex, each label representing a candidate position of the vertex on the ray, e) providing, based in the corrected boundary representation, a representation of likelihoods for each candidate position the likelihood referring to whether the candidate position corresponds to a surface point of the organ, i.e. blood vessel in the image representation, f) defining a first order Markow Random Field with discrete multivariate random variables, the random variables comprising the labels of the candidate positions and the representation of likelihoods, g) finding, i.e. searching for and/or identifying an optimal segmentation (such as a segmentation model and/or mesh) of the blood vessel by using an maximum a posteriori estimation in this Markow Random Field. Thereby, an optimal segmentation is characterized by the fact that the segmentation shows an optimal likelihood that the segmentation model represents a true surface of the vessel lumen.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention. They are not necessarily drawn to scale.

FIG. 9 shows a cross-sectional image of a blood vessel with corresponding first curves for the detection of calcified plaque in the context of the process of FIG. 1, FIG. 10 shows the same cross-sectional image of the blood vessel with corresponding second curves for the detection of calcified plaque in the context of the process of FIG. 1.

DETAILED DESCRIPTION OF THE EXAMPLE EMBODIMENTS

Figure 1:
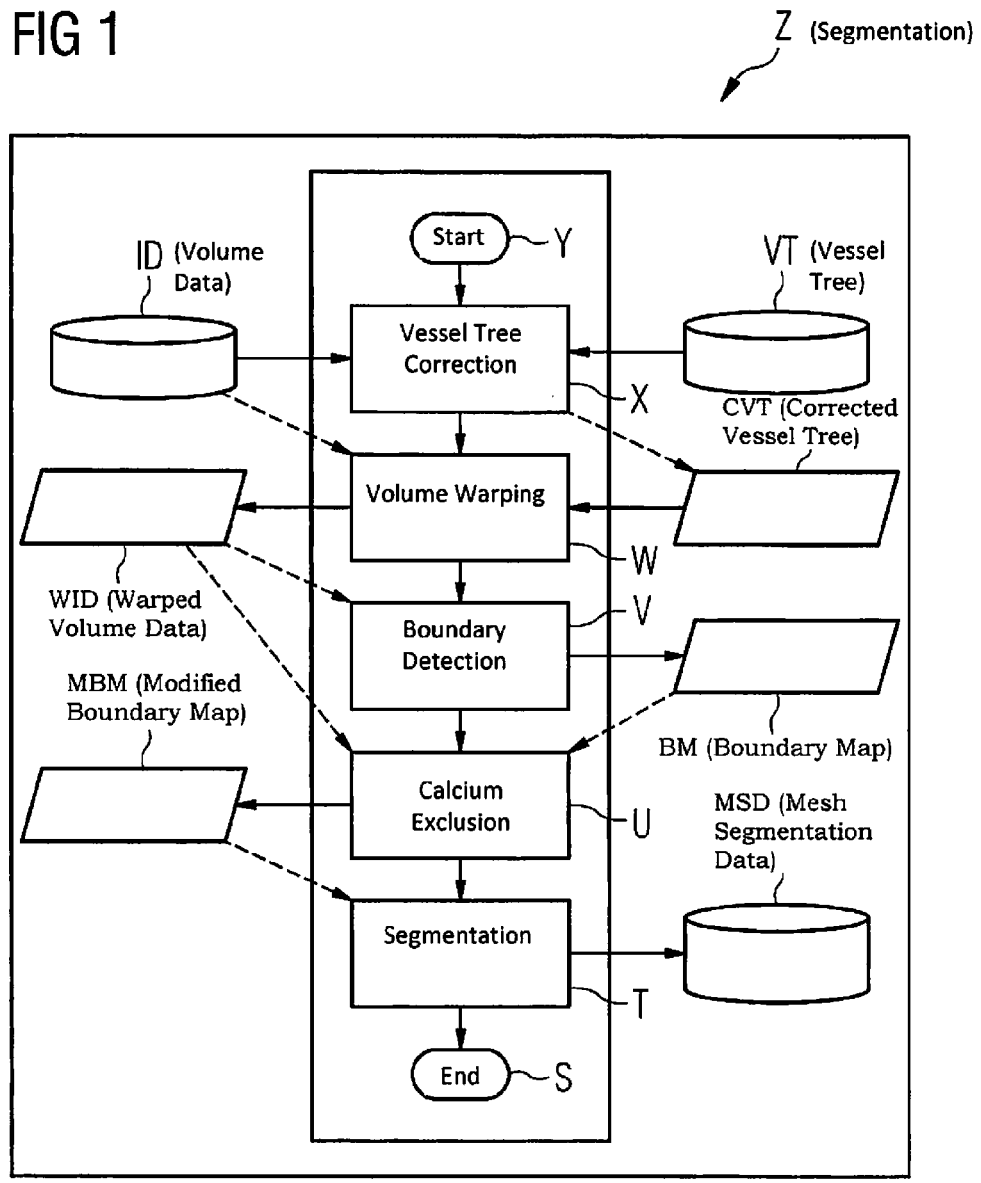
FIG. 1 shows a schematic block diagram of a segmentation process according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A method and a segmentation system are disclosed.

According to at least one embodiment, a method comprises providing a vesseltree representation of the blood vessel. Such vesseltree representation may for instance comprise a number of progression lines of the blood vessel(tree) such as a centerline or the like.

providing a number of preliminary boundary representations of a number of cross-sections of the blood vessel. Such a preliminary boundary representation may for instance comprise a boundary map of the cross-section.

providing a number of intensity profiles in the image data in the number of cross-sections. The intensity profiles represent intensities of the image data in the cross-sections and thus depend on the acquisition method used for image data acquisition. For instance, in CT, intensity profiles are based on (i.e. correspond to) Hounsfield Unit values in the image data.

determining a calcification in the cross-section based on the intensity profile. The intensity profile is now used to detect calcifications, e.g. calcified plaque.

correcting each preliminary boundary representation into a corrected boundary representation which excludes the calcification from an inner part of the blood vessel.

In this context, it may be noted that the image data can be virtually any medical image data, in particular tomographic image data. They can comprise two-dimensional and/or three-dimensional and/or four-dimensional image data (whereby one dimension thereof may be the dimension of time which implies that the image data comprise moving images over time).

According to at least one embodiment of the invention, a segmentation system comprises:

an input interface for the image data. Via that interface the image data are fed into the segmentation system, for instance from a PACS or from an imaging device.

a first provision unit realised to provide a vesseltree representation of the blood vessel. Such provision unit can be realised as a computation unit which derives the vesseltree representation from the image data, but also merely comprise an input interface—which can also be combined with the first input interface, for instance as one common interface.

a second provision unit (also input interface) realised to provide a number of preliminary boundary representations of a number of cross-sections of the blood vessel. This second provision unit can be combined with the first provision unit or stand alone. Again, it may be realized as a computation unit which derives the preliminary boundary representations from the image data or it may comprise an input interface, which can, again be freely combined with any of the above-mentioned other input interfaces in the according manner.

a third provision unit realised to provide a number of intensity profiles in the image data in the number of cross-sections. That third provision unit is preferably realized as a computation unit which, based on the image data, provides the intensity profiles.

a determination unit which in operation determines a calcification in the cross-section based on the intensity profile. That determination unit is again preferably realized as a computation unit which, based on the intensity profiles, determines the calcification.

a correction unit which in operation corrects each preliminary boundary representation into a corrected boundary representation which excludes the calcification from an inner part of the blood vessel.

Further, at least one embodiment of the invention concerns an imaging device with an acquisition unit and a segmentation system according to at least one embodiment of the invention.

The segmentation system according to at least one embodiment of the invention, in particular its first and/or second and/or third provision units, the determination unit, and the correction unit (but also other components of the segmentation system which are mentioned below) may be partially or wholly accomplished by hardware components, for example using semiconductor chips such as ASICs (Application Specific Integrated Circuits), FPGAs (Field Programmable Gate Arrays), or PLAs (Programmable Logic Arrays). They may, however, also be comprised of software components or combinations of hardware and software components. Therefore, the invention also concerns a computer programme product computer programme product directly loadable into a processor of a programmable segmentation system comprising programme code segments to conduct all steps of a method according to embodiments of the invention when the computer programme product is executed on the segmentation system.

Particularly advantageous embodiments and features of the invention are given by the dependent claims, as revealed in the following description. Features of different claim categories may be combined as appropriate to give further embodiments not described herein.

According to a preferred embodiment, the number of intensity profiles is determined in the number of cross-sections along a number of profile rays from one seed point within the blood vessel in each cross-section towards the preliminary boundary representation, and possibly beyond.

It is also preferred that the calcification is determined in a region the intensity of which is above a predefined threshold level. Thereby, preferably image data are based on X-ray acquisition (as is for instance the case in CTs) and the threshold level is above 576 HU, namely the typical HU-level of calcifications.

It is further preferred that a result from the determination of the calcification is compared to an extension of the preliminary boundary representation for validation of the result. This provides for a higher precision of the segmentation results and constitutes a kind of cross-check of results.

Preferably, as mentioned above, the vesseltree representation comprises a progression line, in particular a centerline of the blood vessel. Thereby it is further preferred that the centerline is recentered at least once, preferably at least once after correcting the preliminary boundary representation. This helps to improve the precision of the centerline in an iterative process.

Further, it is preferred that the image data are warped such that the vesseltree representation is aligned along a straight line and the number of preliminary and/or corrected boundary representations are aligned parallel to one another. This makes the further steps of the process easier to handle and reduces calculational expenses.

Preferably, the number of preliminary boundary representations is generated deriving likelihood values of candidate points in the respective cross-section. That implies that the preliminary boundary representations do not fixedly represent the boundary of the blood vessel but rather comprise likelihood indications of where the boundary of the blood vessel is situated according to probabilities. Thereby, the likelihood values are preferably derived using a trained classifier algorithm such as a probabilistic boosting tree or a random forest algorithm.

Generally, the method according to at least one embodiment of the invention can be part of any larger methodological frameworks of segmentational steps. It is however preferred that it is included in a particularly preferred larger segmentation method which comprises:

a) providing an image representation of the calcified blood vessel, b) providing a start surface model, comprising a mesh with a plurality of vertices connected by edges, in particular undirected edges, c) defining for each vertex of the plurality of vertices a ray normal to the surface model at the position of the (corresponding) vertex, d) assigning more than two (for instance five) labels to each vertex, each label representing a candidate position of the vertex on the ray, e) providing, based in the corrected boundary representation, a representation of likelihoods for each candidate position the likelihood referring to whether the candidate position corresponds to a surface point of the organ, i.e. blood vessel in the image representation, f) defining a first order Markow Random Field with discrete multivariate random variables, the random variables comprising the labels of the candidate positions and the representation of likelihoods, g) finding, i.e. searching for and/or identifying an optimal segmentation (such as a segmentation model and/or mesh) of the blood vessel by using an maximum a posteriori estimation in this Markow Random Field. Thereby, an optimal segmentation is characterized by the fact that the segmentation shows an optimal likelihood that the segmentation model represents a true surface of the vessel lumen.

The calcium exclusion step in this overall framework can also be based on different techniques than the ones described in this example. In particular, the last step—namely the final segmentation step—can be realized according to a different logic altogether.

The lumen segmentation framework shown here is performed in multiple stages which produce a mesh representation of the lumen surface in a pipe-line like manner. FIG. 1 gives an overview of the framework and visualizes the main control and data flow.

The segmentation Z starts at a starting point Y and has a first step X in which volume data ID, i.e. image data ID and a (for instance previously tracked) vesseltree VT serve as input, whereas the segmented coronary arteries—in a mesh representation i.e. mesh segmentation comprising mesh segmentation data MSD—form the output of this framework at an end point S.

Firstly, the algorithm's input data ID, VT, CVT are preprocessed in a first—optional—vesseltree (in particular centerline) correction step X (which results in a corrected vesseltree CVT) and in a volume warping step W from which there result warped volume data WID. Then, potential lumen wall boundaries are detected in a boundary detection step V along cylindrical coordinates and stored in a boundary map BM. In order to exclude calcified regions from the segmentation, the map is analyzed in step U for the presence of calcium and modified if necessary—which results in a modified boundary map MBM.

At last, in step T, the final segmentation is found by embedding the boundary map as an optimization problem into a multilabel Markov Random Field with convex pair potentials and then solving it by utilizing a standard max-flow/min-cut-algorithm. Thereby, the term volume (image—image data) is used interchangeably with volumetric data.

Step X: Vesseltree Correction

Figure 2:
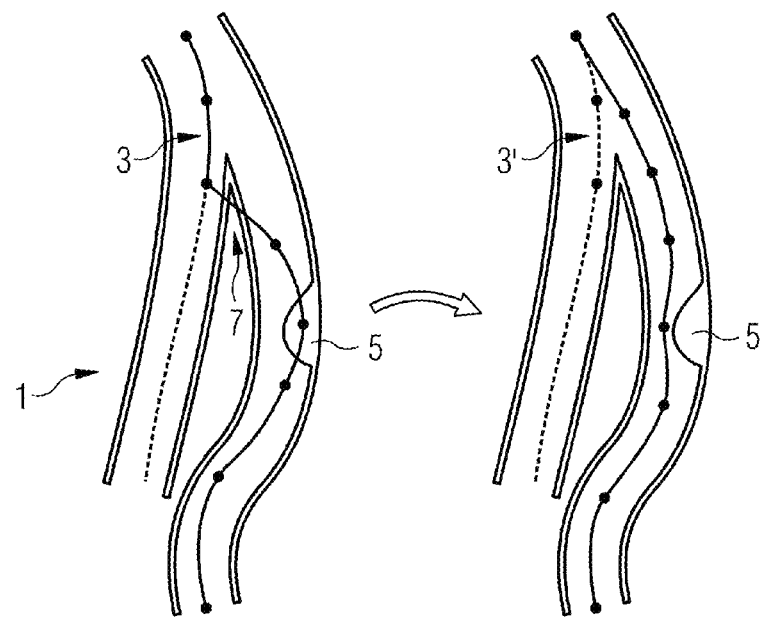
FIG. 2 shows a section view of a blood vessel structure and a progression line thereof in the course of a correction of the progression line according to a step of the process of FIG. 1, FIG. 3 schematically shows different steps of a warping step of the process of FIG. 1.

The correction of the vesseltree generally concerns the correction of its progression line, more particularly its centerline, which is shown with reference to FIG. 2:

The lumen segmentation quality highly depends on the accuracy of the extracted vesseltree progression line of the blood vessel 1, here a centerline 3 (left). Such centerline 3 can be computed using any available progression line (centerline) generating algorithm of which there are numerous available.

The overall segmentation algorithm of this example includes the centerline points in the final lumen segmentation result by default. This is due to the ray-casting method (cf. below) that samples potential boundary positions at radial distances from the centerline point. In an ideal case the extracted vesseltree would always travel along points at the center of the lumen. In practice though, the extracted vesseltree of coronary arteries can lack accuracy and branch falsely, especially at regions with plaque 5 and severe occlusions. Furthermore, at furcations 7 it is possible that the centerline 3 follows a short-cut rather the real lumen position (cf. FIG. 2 left). A repositioning of the points that assemble the vesseltree (cf. FIG. 2 right) can ensure that the corrected centerline 3' runs always distant from the lumen wall, even in the presence of severe lesions. The centerline correction X can be performed with methods provided by Zheng et al.: Model-Given Centerline Extraction for Severely Occluded Major Coronary Arteries. In: Machine Learning in Medical Imaging. 2012. pp. 10 to 18. The algorithm in this reference also provides an estimate of the lumen intensity distribution (or lumen likelihood). This allows for any image voxel of the image data to map from its intensity to the likelihood of being within the vessel lumen.

As a result of the vesseltree correction step X the corrected centerline 3' (at least roughly—i.e. approximately) goes through the lumen centre of the blood vessel 1 and avoids to hit calcified plaques 3.

Step W: Volume Warping

Figure 3:
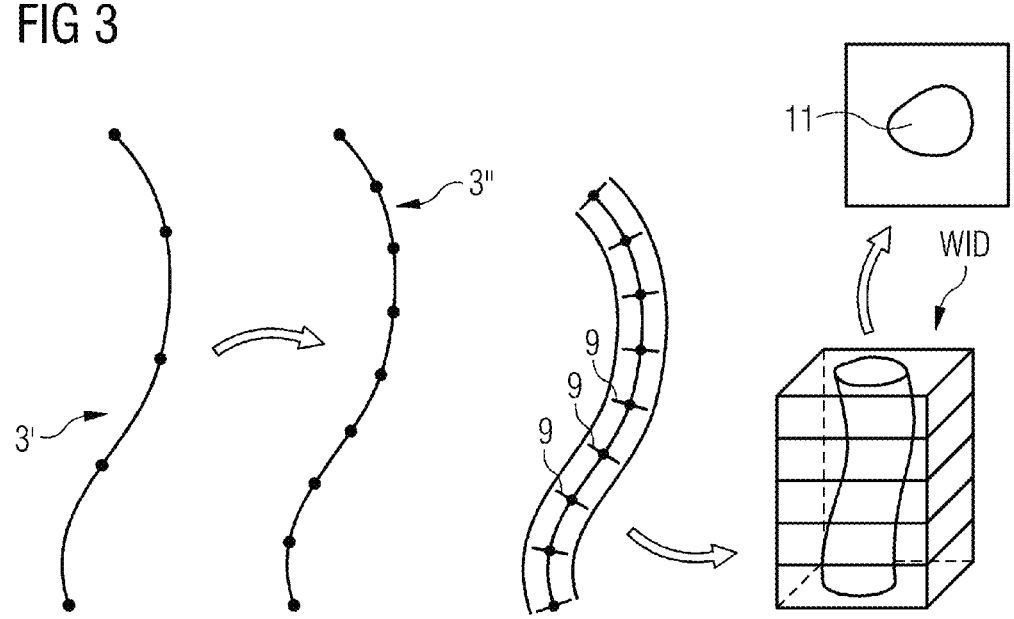

Step W is explained with reference to FIG. 3. Thereby, a warped and resampled version of the volumetric input image data ID is generated.

Since the lumen boundary of the blood vessel 1 has to be determined exactly at those parts of the volume of the image data ID where the extracted centerline 3, 3' runs, a particular focus is given to those regions in particular. These regions are determined by centerline segments which are generated by splitting the (optionally corrected) centerline 3, 3' at furcation points.

In order to get a homogeneous slice distance and to thus avoid image distortion, the centerline 3' is first resampled into a resampled centerline 3'' of a certain resolution (e.g. 0.1 mm) using, for instance a bicubic spline interpolation.

Then, for each point of the resampled centerline 3'', orthogonal cross-sections 9 (slices 9) of the volumetric data are extracted by cutting them with a plane that is centered on that point and spans perpendicular to the centerline direction of the resampled centerline 3''. That means that for each centerline point of the resampled centerline, an image slice 9 orthogonal to the resampled centerline 3'' is interpolated with bi-linear interpolation at positions between voxels.

These slices 9 are stored in a volume by parallelly stacking one on top of the other, which produces the warped volume data WID or warped image data WID. The size of each slice is preferably adjusted to the maximum expected size of the extracted structure, i.e. it should at least cover an area which is big enough to show a cross-section 11 through the blood vessel 1 with maximum diameter of the blood vessel 1. Since the diameter of coronary arteries does not exceed about 10 mm in size, the plane of interest in such case can safely be restricted to a size of 15 mm by 15 mm. If other blood vessels are segmented, larger sizes may be applied accordingly.

As a result of the warping step W, the (resampled) centerline 3″ is a straight line in the warped image space and runs through the centre of each slice of the warped volume data WID. An advantage of this transformation (warping) step W is that the lumen segmentation can now be performed in a cylindrical coordinate system which is particularly suitable for tubular structures such as blood vessels.

Step V: Boundary Detection

The goal of the boundary detection step is to determine a (preliminary) boundary that separates the lumen of the blood vessel inside from its wall at each slice in the warped volume. To accomplish that, one first needs to find candidates at potential boundary positions and evaluate their suitability. In other words, boundary point candidates are generated and assigned a likelihood value.

Figure 4:
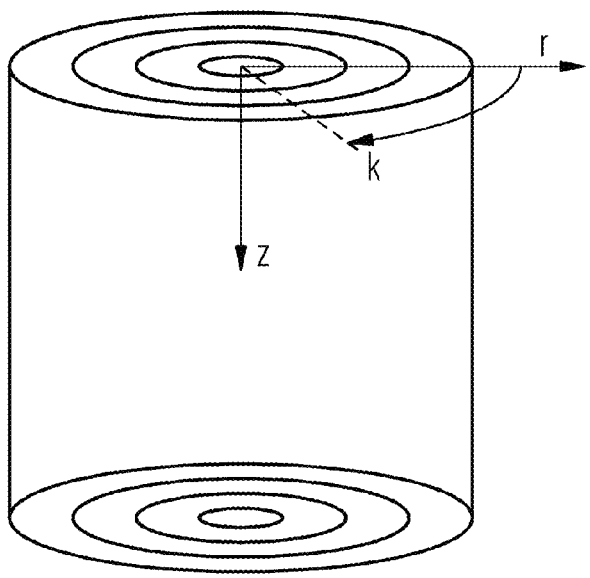
FIG. 4 shows a tubular coordinate system which can be used in the context of the process of FIG. 1.
Figure 5:
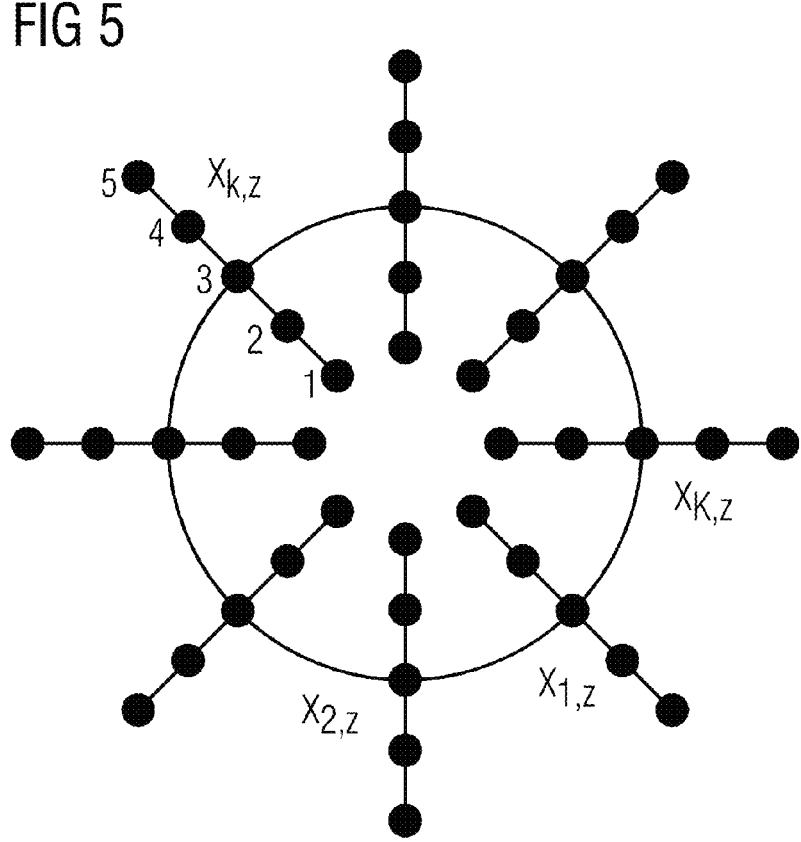
FIG. 5 shows a schematic representation of a slice within the coordinate system of FIG. 4.

It is advantageous to search for the lumen wall in polar, respectively cylindrical, coordinates instead of using a Cartesian coordinate system because the detection of the lumen contour is reduced to a number of searches along a one-dimensional ray. Such cylindrical coordinate system is depicted in FIG. 4. Thereby, the height of a slice 9 in the warped volume is expressed by the coordinate z, whereas the angle k and the radial distance r determine a point in the cross-sectional plane (i.e. slice 9) in polar coordinates.

The following procedure is also known as a ray-casting method: considering the center of a slice—being the lumen center—to be a pole, a dense radial sampling around the lumen center becomes feasible using a small parameter space.

Figure 6:
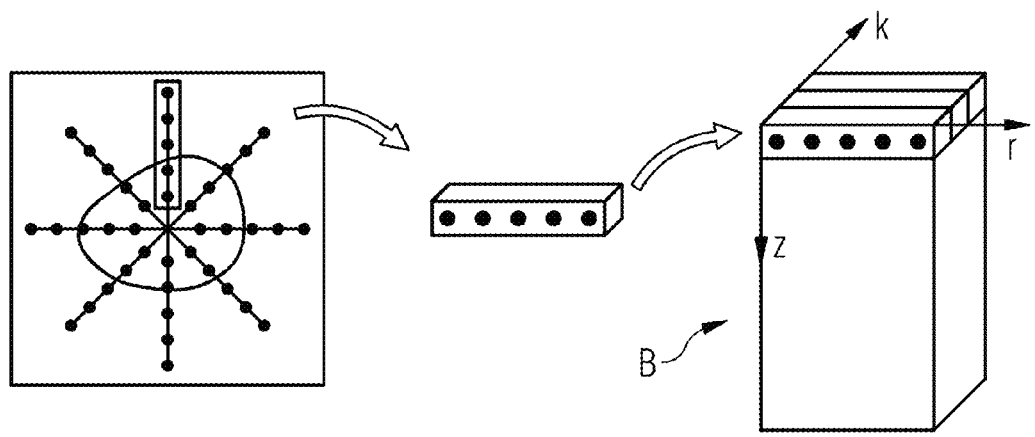
FIG. 6 shows a schematic depiction of the construction of a boundary map in the context of the process of FIG. 1.

FIG. 6 shows boundary candidate points generated for an equidistant selection of slices $z \in [1,Z]$ of the warped volume, for instance for every slice or for every fifth slice (depending on the desired accuracy). In each such slice R points (here: 5 points) along K rays are generated. Each of the points is thus defined by the slice, the angle k and the position 1 to 5 along its ray.

Each of such generated candidate boundary point is then evaluated for its likelihood to lie on the lumen boundary of the blood vessel. For that purpose different well-established models and methods are applicable such as the weighted intensity differences method, the gradient magnitudes method or probability determination method based on previously trained classifier algorithms such as random forest or probabilistic boosting tree algorithms. It is expected that they yield a higher likelihood score at positions that are close to the lumen boundary. One can expect this boundary likelihood to be expressed as a scalar between 0 and 1. For convenience, the obtained likelihood values of the candidate boundary points can be stored in a volume l (k, z, r) of dimension K×Z×R, the boundary map B, as depicted in FIG. 6.

Each element in the boundary map should be a non-negative value, that yields only high values at positions close to the true lumen wall. One can hereby make use of the fact that tissue inside the lumen has a higher intensity (e.g. HU-) value than outside the wall. That means, e.g. a large positive forward-difference calculated at successive positions along a ray can be used to indicate a boundary. There are now a number of possibilities to incorporate this into an algorithm. Two of the most obvious approaches are to either explicitly exploit derivatives to gain a lumen boundary score, or to use them implicitly, more precisely, to let a variety of derivative-features be evaluated by classifiers in a machine learning approach to yield the sought probabilities.

Boundary detection against the background of machine learning is commonly formulated as a binary classification problem. What is needed therefore is some ground truth annotations, for instance from previous manual segmentations supplied in a trained database: a trained classifier is used to predict the probability for a lumen wall being present at each location given a feature sample. In order to train a classifier, a set of correctly-classified observations has to be made available to the classifier such that it can learn the distinguishing characteristics (features) from the observations. This is also referred to as supervised learning. That means, one has to provide two sets of feature data, one being evaluated at the true lumen wall (positive) and the other one being computed distant from the boundary (negative). After the training step, the classifier can be used to predict the boundary probability for any unseen feature sample and can thus be used for evaluation in the herein-described context of boundary likelihood evaluation.

Figure 7:
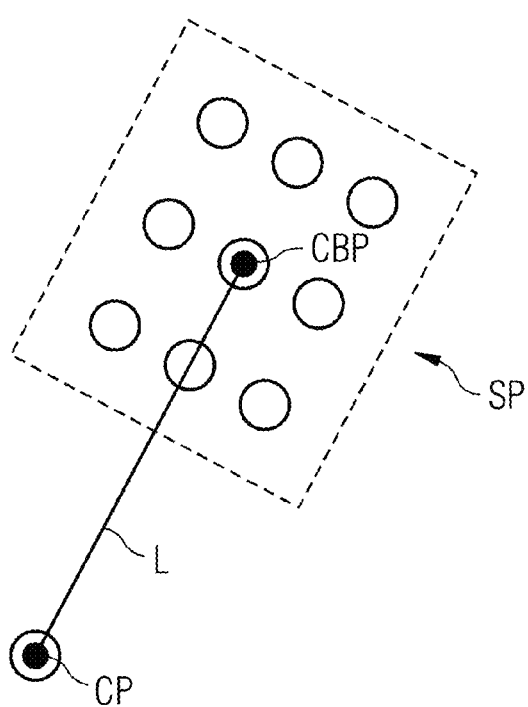
FIG. 7 shows a schematic representation of a feature extraction process in the context of the process of FIG. 1.

For every candidate boundary point at a location (k, z, r) the classifier predicts whether (i.e. with which likelihood or probability) it is part of the lumen boundary of the blood vessel 1 or not. Its prediction is based on low-level image features F(k, z, r) of the image data ID extracted from a local neighbourhood of the boundary candidate point in question, which is described in more detail with reference to FIG. 7:

For each candidate boundary point CBP, an image feature sampling pattern SP is defined based on the point's CBP local orientation determined by the line L connecting the centre point CP of the blood vessel in the corresponding slice 9 and the potential (candidate) boundary point CBP. At each sampling position, low-level image features such as intensity and gradient are then computed. A binary classifier is then trained based on a representative set of manually segmented training data using these features to determine the likelihood/probability of the candidate boundary point CBP being on the blood vessel's boundary. Any binary classifier can be used such as the above-mentioned probabilistic boosting tree or random forest classifiers, which in tests both delivered results of similar high accuracy.

Figure 8:
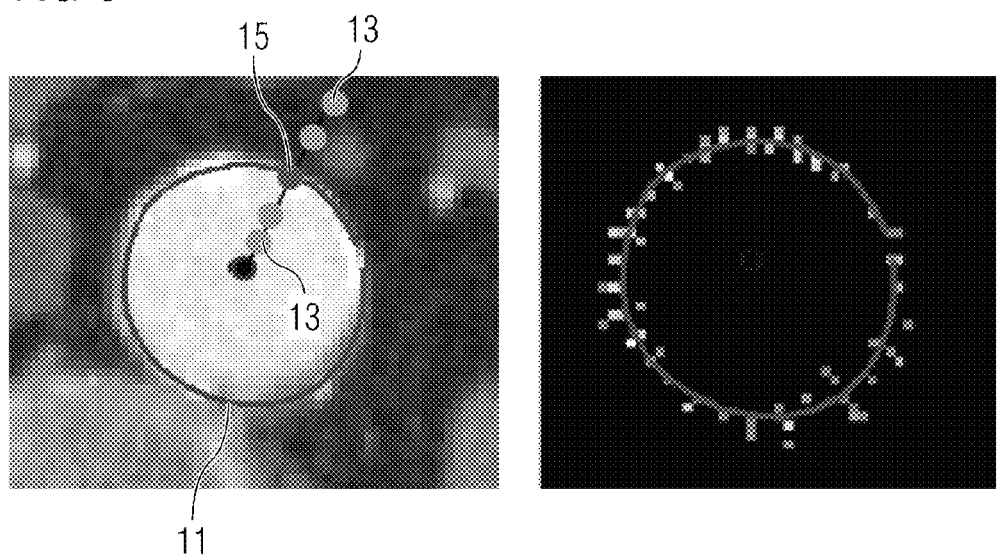
FIG. 8 shows two images of a cross-section of a blood vessel with an annotated boundary map which can be used in the context of the process of FIG. 1.

In training, for each orientation, the intersecting point 15 between the ray and the ground truth annotation 11 is considered as positive and the remaining points 13 on the ray are considered negatives as shown in FIG. 8 (left). FIG. 8 (right) shows the result of a boundary detection process based on the classifier algorithm using the ground truth from the left in the form of a probability map output.

Step U: Calcium Exclusion

For a reliable lumen segmentation the correct handling of calcified plaque is mandatory especially when the boundary detection is in the broadest sense based on image gradients. Due to the fact that calcium in CT images is characterized by high intensity values and is, hence, often similar to intensities captured inside the lumen, it is often erroneously classified as lumen tissue and boundaries are detected between plaque and vessel back-ground rather than lumen and plaque. However, calcified regions in coronary arteries indicate life-threatening stenoses and are per definition not part of the blood-flowed lumen and therefore, have to be excluded from the segmentation results. For that purpose, boundaries are to be detected between (calcified) plaque and the blood vessel lumen rather than between (calcified) plaque and the blood vessel background.

In order to comprehend why calcified plaque is erroneously included in the segmentation, the inventors analyzed the radial profile of intensity, lumen probability and boundary probability values for abnormalities. Their profile exhibits a certain pattern when the corresponding ray is passing through a calcified region instead of a healthy one.

FIGS. 9 and 10 show on top the same cross-sectional view of a blood vessel. In FIG. 9 a ray 17 through a healthy part of the blood vessel is shown, whereas in FIG. 10 a ray 17' in a different direction within the same blood vessel passes through calcified plaque which can be distinguished by the lightness of the picture in the region of the plaque. On the bottom diagrams of the two figures, profiles for the image intensity JJ, the lumen likelihood LL (cf. step X) and the boundary likelihood (cf. step V) have been extracted for a slice and a particular ray at a given angle such as the two different rays 17, 17' in the two figures. The horizontal axis shows a distance d in mm whereas the vertical axis refers to a likelihood L in numbers between 1 and 0 and to an intensity J without numbers given but with a set zero threshold level which corresponds to a CT image intensity of 576 HU As for FIG. 9, the image intensity JJ is always below the set threshold level. Whilst the lumen likelihood from left to right shows a comparatively steady curve downwards to zero, the boundary likelihood shows essentially one peak at about position 1.3 mm.

As for FIG. 10, the image intensity exceeds the set threshold level at about a distance of 1.5 mm, reaching a peak value at about 2.2 mm and going below the set threshold level at about 2.7 mm. The lumen likelihood LL shows two peaks and the boundary likelihood BL shows even three peaks, the leftmost of which corresponds to the true lumen boundary which excludes the calcified plaque. The rightmost peak of the boundary likelihood BL refers to a boundary that erroneously includes the calcified plaque. A corrected boundary likelihood $l_c$ corresponds to the true boundary likelihood which excludes the calcified plaque. This is accomplished in a heuristic approach as follows:

First, the calcified plaque is identified by determining the ranges of the intensity profile that are above a certain predefined threshold, here the set threshold of 576 HU. In order to increase robustness and prevent false responses the threshold can be raised dependent on the current image data by adding to it (or reducing it by) an image data dependent variance (preferably twice such variance), based on lumen intensity distribution (cf. step X). The set threshold $t_{CAL}$ can thus be a chosen constant or an adaptive one using a fixed threshold $t_f$ and the mean lumen intensity $\mu_1$ plus twice its variance $\sigma_1$ so that $$t_{CAL} = \max(t_f, \mu_1 + 2\sigma_1) \quad (1)$$

Then, the range along the ray 17' which is closest to the centerline and which preferably has a certain minimum length of e.g. 0.3 mm is regarded as the relevant calcified range. In addition to the index of the starting radius $r_0$ at the centerline point there is also extracted the radius $r_m$ for which the intensity is maximal within the calcified range (that is the peak of the image intensity JJ at about 2.2 mm in FIG. 10). Then, the corrected boundary likelihood $l_c$ along the ray 17' is obtained as $$l_c(k, z, r) = \begin{cases} l(k, z, r) & r < r_0 \\ l(k, z, r) \cdot d_{CAL}^{(r-r_0)/\Delta r} & r_0 \leq r < r_m \\ 0 & r \geq r_m \end{cases} \quad (2)$$

where $\Delta_r$ is the radial sampling resolution (e.g. $\Delta_r$=0.1 mm) and $d_{CAL}$ is a damping factor which determines the speed of decay of the boundary likelihood profile between $r_0$ and $r_m$. For instance, $d_{CAL}$ can be set as 0.6.

As can be seen in FIG. 10, this strategy leads to a corrected boundary likelihood profile with only one peak which describes a boundary which correctly excludes the calcified plaque.

It may be noted that after the correction of the boundary likelihoods of the blood vessel, it is possible to re-correct the progression line (centerline) as proposed in step X because the lumen of the modelled blood vessel may have changed considerably.

Step T: Segmentation

In the last step, optimal boundaries of the blood vessel are found from the corrected boundary map. In addition to the (corrected) boundary likelihood, 3D smoothness constraints can be considered to avoid unsteady contours and to accomplish a smooth surface. This problem can be formulated in a first order Markov Random Field (MRF) with discrete multivariate random variables. The problem of finding an optimal segmentation can then be regarded as a maximum a posteriori (MAP) estimation in this MRF for which an efficient solver based on the max-flow algorithm has been proposed by Ishikawa, Hiroshi: Exact Optimization for Markov Random Fields with Convex Priors. IEEE Transactions on Pattern Analysis and Machine Intelligence. Vol 25, No. 10, pp. 1333-1336. This reference is explicitly considered part of the teachings of this description.

Figure 11:
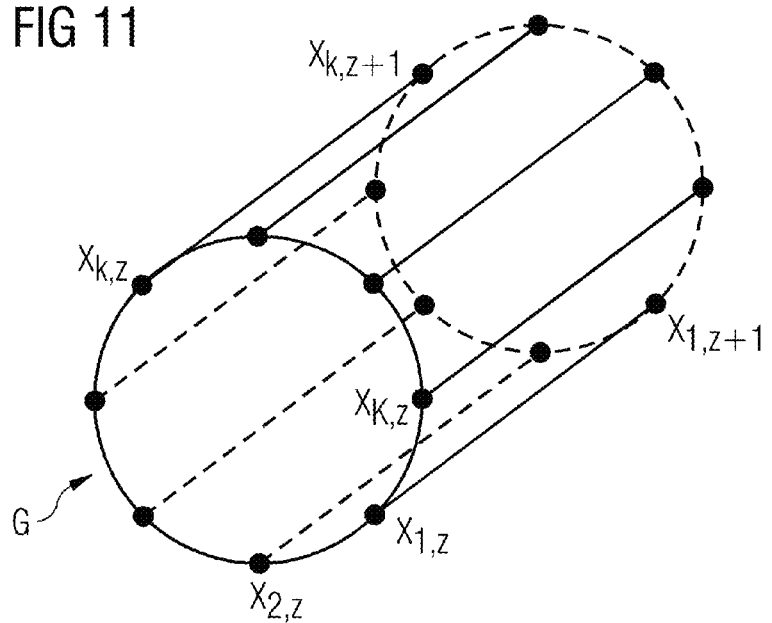
FIG. 11 shows an MRF representation of a blood vessel for use in the context of the process of FIG. 1.

More formally (cf. FIG. 11), a graph G=(V,E) is defined with a set of vertices V and a set of undirected edges $E \subset V \times V$. A MRF includes a graph G, a finite set of labels $L=\{l_1, \ldots l_R\}$ and a probability distribution P on the space of potential label assignments $X=L^V$ which is the amount of all labels L. Each label thus refers to a (candidate) position along the ray normal to the initial surface model of the blood vessel at the position of the vertex. Thereby, a normal can be considered to be the mean normal of normals of the adjacent mesh surfaces of the position of the vertex.

An element $X \in X$, which can also be considered a configuration, is a map that assigns each vertex v a label $X_v$ in L. As is known from the above reference of Ishikawa, one can effectively minimize multi-label energy functions of the form $$E(X) = \sum_{(u,v) \in E} \gamma_{uv} g(X_u - X_v) + \sum_{v \in V} h(v, X_v) \quad (3)$$

where $g(\cdot)$ is a convex function weighting the label difference of vertex u and vertex v. $\gamma_{uv}$ is a predefined smoothness factor which will be explained below.

The first of the above-given sums can be referred as prior as it is data dependent, whereas the second of these sums can be called a data term as it incorporates the observations (i.e. the boundary likelihood in this case). Energy functions of this form can be converted into an equivalent graph-cut problem which can be solved exactly within polynomial time by a min-cut/max-flow algorithm of which there are several variants available.

The segmentation problem is formulated as an MRF as follows: Each vertex v of the MRF corresponds to a mesh vertex of the tubular mesh (cf. FIG. 11) which is denoted by an angle (or ray number) k and a height z.

Figure 12:
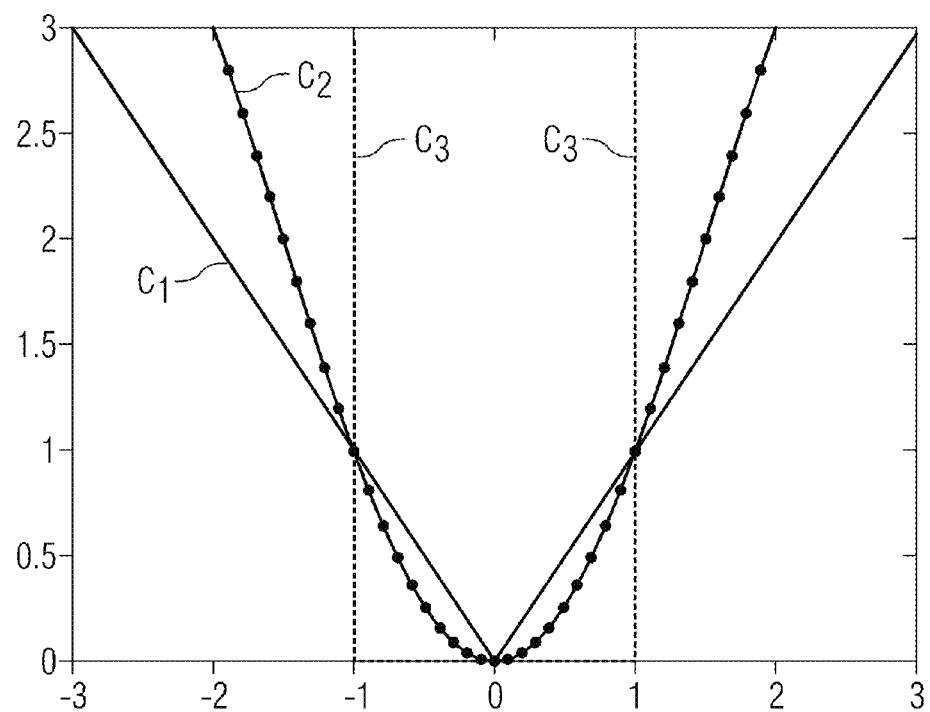
FIG. 12 shows three result curves of convex functions which functions can be used alternatively in the context of the process of FIG. 1.

The associated random variable $X_{k,z}$ is a multivariate, takes an integer value r in the range of [1 . . . R] (corresponding to the label set $L=\{l_1 \ldots l_R\}$) and represents the event that the surface goes through the boundary candidate at height z, and angle k and a radius r. The data term of equation (3) is then defined as $h(v,X_v)=h(X_{k,z})=-\log(l(r,k,z))$, the negative logarithmic likelihood (negative in order to be able reduce the energy function of equation (3) with increasing likelihood) of the boundary candidates computed on the previous step U. It may be noted in this context that $\log(l(r,k,z))$ may also refer to $\log(l_c(r,k,z))$, i.e. to the corrected boundary likelihood after the calcium exclusion step. While for the prior term (the smoothness term) in equation (3) an arbitrary convex function $g(\cdot)$ can be chosen, three types of functions are particularly well-suited:

$$g(d) = \beta|d| \qquad (4)$$
(L1 norm)

$$g(d) = \beta \begin{cases} 0 & |d| \leq \alpha \\ (|d|-\alpha) & |d| > \alpha \end{cases} \qquad (5)$$
($\varepsilon$-insensitive)

$$g(d) = \beta \begin{cases} (d/\alpha) & |d| \leq \alpha \\ 2|d/\alpha|-1 & |d| > \alpha \end{cases} \qquad (6)$$
(Huber function)

where $d=X_u-X_v$ is the difference between two integer labels between variables $X_u$ and $X_v$ that are neighbours U, $v \in E_G$ in the MRF graph. The functions are parameterized through a threshold parameter $\alpha$ and a slope parameter $\beta$. The corresponding curves $C_1$ for equation (4), $C_2$ for equation (6) and $C_3$ for equation (5) are depicted in FIG. 12. While equation (6) can be considered to deliver the most precise results, results from equation (4) can be computed fastest and equation (5) lies in the middle between both these functions with respect to speed and precision.

Figure 13:
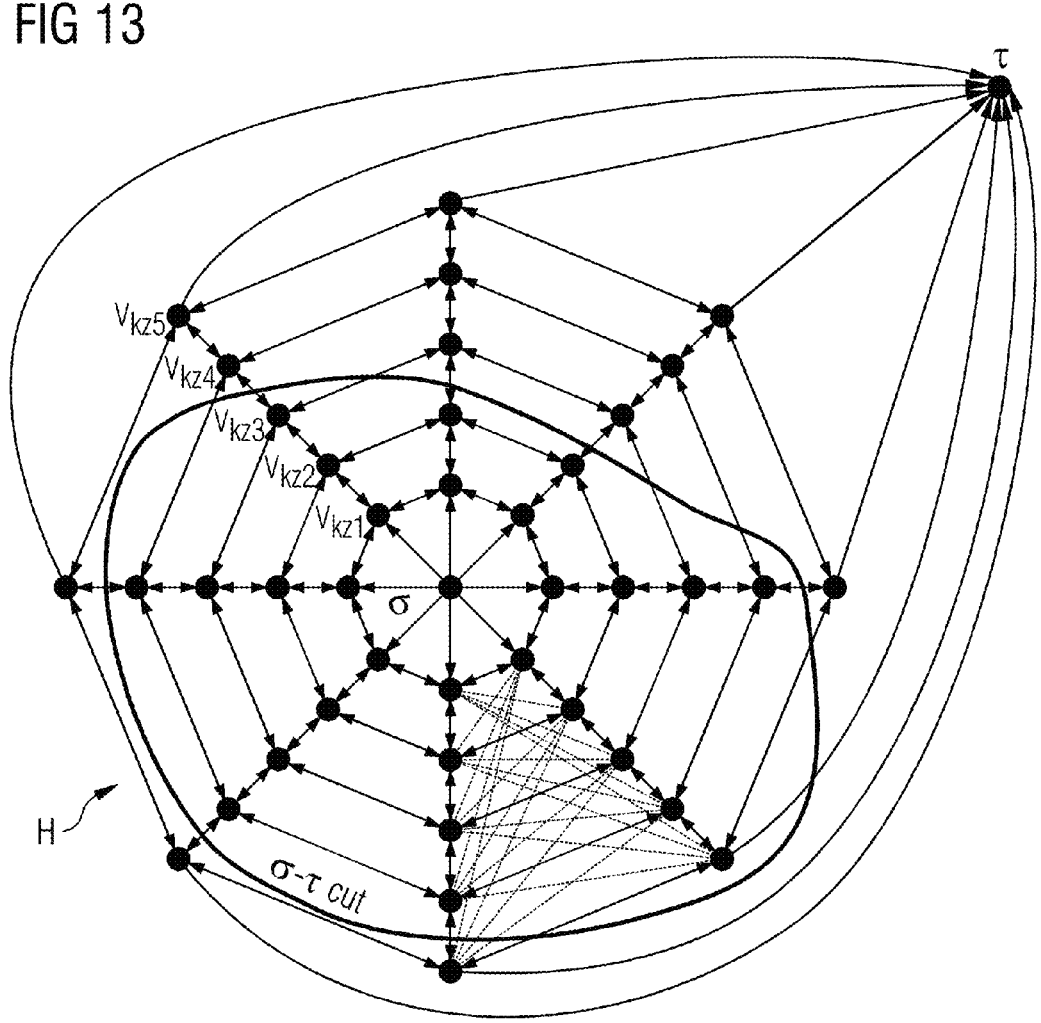
FIG. 13 shows a constructed graph for max-flow analysis in the context of the process of FIG. 1.

Given the MRF represented by the undirected graph G and the defined potentials, a graph-cut problem is formulated for minimizing equation (3). To this end, a directed graph H is constructed with KZR+2 vertices and directed edges u, $v \in E_H$ that are associated with positive capacities $c(u,v) > 0$. The graph is constructed in a way that every $\sigma$-$\tau$ cut in H (i.e. a cut that separates a source $\sigma$ and a sink $\tau$—cf. FIG. 13) corresponds to a configuration (i.e. to a variable assignment) $X \in X$ of the MRF G and the cost of the cut (i.e. the sum of the capacities $c(u,v)$ of the edges of H that are in the cut) is the cost of this configuration according to equation (3) (cf. FIG. 13). Pseudo-code for generating the graph H is provided in algorithms (1), (2), and (3), where H.addCapacity (u, v, a, b) adds the capacities a and b to the two directed edges between u and v, i.e. $c(u,v)=c(u,v)+a$ and $c(v,u)=c(v,u)+b$.

---
Algorithm 1: Graph construction - data term
---
input: boundary map l(k, z, r) of dimension K × Z × R
output: graph H with data term capacities
/* add data terms
for k ← 1 to K do
| for z ← 1 to Z do
|  | H.addCapacity ($\sigma$, $V_{k,z,1}$, $\infty$, 0);
|  | for r ← 1 to R - 1 do
|  |  | H.addCapacity ($V_{k,z,r}$, $V_{k,z,r+1}$, -log(l(k, z, r)), $\infty$);
|  | H.addCapacity ($V_{k,z,R}$, $\tau$, -log(l(k, z, R)), 0)

---
Algorithm 2: Graph construction - smoothness term
---
input: smoothness weight factors $Y_z$ and $Y_k$
parameters: Dimension K, Z, R of the problem
output: graph H with smoothness term capacities
/* add smoothness terms between slices
for k ← 1 to K do
| for z ← 1 to Z - 1 do
|  | addPairPotential (H, k, z, k, z+1, $Y_z$)
/* add smoothness terms between rays
for z ← 1 to Z do
| for k ← 1 to K - 1 do
|  | addPairPotential (H, k, z, k+1, z, $Y_k$)
| addPairPotential (H, K, z, 1, z, $Y_k$)

---
Algorithm 3: Graph construction - addPairPotential
(H, $k_0$, $z_0$, $k_1$, $z_1$, Y)
---
input: H, $k_0$, $z_0$, $k_1$, $z_1$, Y
parameters: Dimension K, Z, R of the problem
output: graph H with modified capacities
for d ← 0 to R do
| if c (d) > 0 then
|  | c = Y cap (d) ;   /* see equation (7) below */
|  | if d = 0 then
|  |  | c = c/2 /* added twice to the same edge for d = 0 */
|  | for r ← 1 to R-d do
|  |  | H.addCapacity ($V_{k_0,z_0,r}$, $V_{k_1,z_1,r+d}$, c, c);
|  |  | H.addCapacity ($V_{k_1,z_1,r}$, $V_{k_0,z_0,r+d}$, c, c);
|  | for r ← 1 to d-1 do
|  |  | H.addCapacity ($V_{k_0,z_0,1}$, $V_{k_1,z_1,d-r}$, c, c);
|  |  | H.addCapacity ($V_{k_1,z_1,1}$, $V_{k_0,z_0,d-r}$, c, c);
|  | for r ← 0 to d-1 do
|  |  | H.addCapacity ($V_{k_0,z_0,R-r}$, R-r, $\tau$, c, c);
|  |  | H.addCapacity ($V_{k_1,z_1,R-r}$, R-r, $\tau$, c, c);

Besides the two distinguished vertices $\sigma$ and $\tau$, each vertex in H corresponds to a variable assignment $X_{k,z}=r$ and is thus denoted by $V_{k,z,r}$. Capacities representing the data term $$\sum_{v \in V} h(v, X_v)$$

from equation (3) are added to the edges between $V_{k,z,r}$ and $V_{k,z,r+1}$ as H.addCapacity ($V_{k,z,r}$, $V_{k,z,r+1}$, -log(l(r.k.z)), $\infty$) and to the edges ($\sigma$, $V_{k,z,l}$) and ($V_{k,z,R}$,$\tau$) as shown in algorithm (1).

Capacities representing MRF pair potentials $\gamma_{uv} g(X_u-X_v)$ from equation (3) are constructed from each edge from the MRF graph G (cf. algorithm (2)). Between the variables $X_{k,z}$ and $X_{k,z+1}$ of neighbouring slices a smoothness factor $\gamma_{uv}=\gamma_k$ is used. Each pair potential may require to add several capacities to the graph H (cf. algorithm (3)) which are computed as second-order differences from the chosen pair-potential functions (cf. equations (4) to (6)) as $$cap(d) = \frac{g(d+1) - 2g(d) + g(d-1)}{2} \qquad (7)$$

Here, $d=r_1-r_0$ is the label difference between the connected variables $X_{k_1,z_1}=r_1$ and $X_{k_0,z_0}=r_0$, i.e. the vertices $V_{k_1,z_1,r_1}$ and $V_{k_0,z_0,r_0}$ in H. Thereby, cap(d)=0 for label distances d where the pair-potential function g(d) is linear and that for these vertices no edges in H are created. Thus, the resulting graph is sparser for pair-potential functions with linear parts, such as equations (4) to (6), which ultimately results in a faster computation of the min-cut/max-flow solution.

Finally, it needs to be stated that any min-cut/max-flow algorithm can be used to obtain the minimum solution of equation (3) which is the configuration X that corresponds to the minimum cut.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Although the invention has been illustrated and described in detail on the basis of the preferred example embodiment, the invention is not limited by the disclosed examples and other variations can be derived herefrom by the person skilled in the art, without departing from the scope of protection of the invention.

What is claimed is:

1. A method for segmentation of a calcified blood vessel in image data, comprising:
   providing a vesseltree representation of the blood vessel;
   providing a number of preliminary boundary representations of a number of cross-sections of the blood vessel;
   providing a number of intensity profiles in the image data in the number of cross-sections;
   obtaining a threshold intensity level based on ranges of an intensity distribution of the intensity profile corresponding to at least one cross-section of the number of cross-sections;
   determining a calcification in the at least one cross-section based on the threshold intensity level; and
   correcting each preliminary boundary representation into a corrected boundary representation which excludes the calcification from an inner part of the blood vessel.

2. The method of claim 1, wherein the providing the number of intensity profiles determines the number of intensity profiles in the number of cross-sections along a number of profile rays from one seed point within the blood vessel in each cross-section towards the preliminary boundary representation.

3. The method of claim 1, wherein the determining the calcification determines the calcification in a region having an intensity above the threshold level.

4. The method of claim 3, wherein the image data are based on X-ray acquisition and wherein the threshold intensity level is above 576 HU.

5. The method of claim 1, wherein a result from the determination of the calcification is compared to an extension of the preliminary boundary representation for validation of the result.

6. The method of claim 1, wherein the vesseltree representation comprises a centerline of the blood vessel.

7. The method of claim 6, wherein the providing the vesseltree includes recentering the centerline at least once.

8. The method of claim 1, further comprising:
warping the image data such that the vesseltree representation is aligned along a straight line and at least one of the number of preliminary and corrected boundary representations are aligned parallel to one another.

9. The method of claim 1, wherein the providing the number of preliminary boundary representations includes deriving likelihood values of candidate points in the respective cross-section.

10. The method of claim 9, wherein the deriving derives the likelihood values using a trained classifier algorithm.

11. A method for segmentation of a calcified blood vessel in image data, comprising:
providing a vesseltree representation of the blood vessel;
providing a number of preliminary boundary representations of a number of cross-sections of the blood vessel;
providing a number of intensity profiles in the image data in the number of cross-sections;
determining a calcification in at least one of the cross-sections based on the corresponding intensity profile;
correcting each preliminary boundary representation into a corrected boundary representation which excludes the calcification from an inner part of the blood vessel;
providing an image representation of the calcified blood vessel;
providing a start surface model, including a mesh with a plurality of vertices connected by edges;
defining, for each vertex, a ray normal to the surface model at the position of the vertex;
assigning more than two labels to each vertex, each label representing a candidate position of the vertex on the ray;
providing, based in the corrected boundary representation, a representation of likelihoods for each candidate position the likelihood referring to whether the candidate position corresponds to a surface point of the blood vessel in the image representation;
defining a first order Markov Random Field with discrete multivariate random variables, the random variables comprising the labels of the candidate positions and the representation of likelihoods; and
finding an optimal segmentation of the calcified blood vessel by using a maximum a posteriori estimation in this Markov Random Field.

12. A segmentation system for segmentation of a calcified blood vessel in image data, comprising:
an input interface for the image data;
a first provision unit configured to provide a vesseltree representation of the blood vessel,
a second provision unit configured to provide a number of preliminary boundary representations of a number of cross-sections of the blood vessel;
a third provision unit configured to provide a number of intensity profiles in the image data in the number of cross-sections;
a determination unit configured to,
obtain the threshold intensity level based on ranges of an intensity distribution of the intensity profile corresponding to at least one cross-section of the number of cross-sections, and
determine a calcification in the at least one cross-section based on the threshold intensity level; and
a correction unit configured to correct each preliminary boundary representation into a corrected boundary representation which excludes the calcification from an inner part of the blood vessel.

13. A tomographic imaging device comprising:
an acquisition unit; and
the segmentation system of claim 12.

14. A non-transitory computer program product directly loadable into a processor of a programmable segmentation system comprising program code segments to perform the method of claim 1 when the computer program product is executed on the segmentation system.

15. The method of claim 7, wherein the providing the vesseltree includes recentering the centerline at least once after correcting the preliminary boundary representation.

16. A non-transitory computer readable medium including program code segments for, when executed on a programmable segmentation system, causing the programmable segmentation system to implement the method of claim 1.

17. A non-transitory computer readable medium including program code segments for, when executed on a programmable segmentation system, causing the programmable segmentation system to implement the method of claim 11.

18. The method of claim 1, wherein the threshold level is based on a variance of the intensity profile corresponding to the at least one cross-section.

19. The method of claim 1, wherein the obtaining obtains the threshold intensity level based on a variance of the intensity profile corresponding to the at least one cross-section.

20. The method of claim 1, wherein the correcting corrects each preliminary boundary representation into the corrected boundary representation using a piecewise function.

* * * * *